United States Patent
Yamada et al.

(10) Patent No.: US 8,444,757 B2
(45) Date of Patent: May 21, 2013

(54) THERMOPLASTIC CELLULOSE ESTER COMPOSITION AND FIBERS MADE THEREFROM

(75) Inventors: Hiroyuki Yamada, Mishima (JP); Yoshitaka Aranishi, Mishima (JP)

(73) Assignee: Toray Industries, Inc., Tokyo (JP)

(*) Notice: Subject to any disclaimer, the term of this patent is extended or adjusted under 35 U.S.C. 154(b) by 105 days.

(21) Appl. No.: 13/126,313

(22) PCT Filed: Oct. 26, 2009

(86) PCT No.: PCT/JP2009/068316
§ 371 (c)(1),
(2), (4) Date: Apr. 27, 2011

(87) PCT Pub. No.: WO2010/050425
PCT Pub. Date: May 6, 2010

(65) Prior Publication Data
US 2011/0203483 A1    Aug. 25, 2011

(30) Foreign Application Priority Data
Oct. 29, 2008 (JP) .................. 2008-278137

(51) Int. Cl.
*C08L 1/12* (2006.01)

(52) U.S. Cl.
USPC .................................. 106/162.72

(58) Field of Classification Search
None
See application file for complete search history.

(56) References Cited

U.S. PATENT DOCUMENTS 6,139,785 A * 10/2000 Shuto et al. .............. 264/207
7,041,730 B2 * 5/2006 Rogers et al. ............ 525/54.2

FOREIGN PATENT DOCUMENTS

| JP | 53023347 | | 3/1978 |
|---|---|---|---|
| JP | 11269304 | | 10/1999 |
| JP | 2004027378 | | 1/2004 |
| JP | 2004027378 A | * | 1/2004 |
| JP | 2004169242 | | 6/2004 |
| JP | 2004177642 | | 6/2004 |
| JP | 2004182979 | | 7/2004 |
| JP | 2007052079 | | 3/2007 |
| JP | 2007277582 | | 10/2007 |
| JP | 2007310325 | | 11/2007 |

OTHER PUBLICATIONS

English translation JP 2004027378.*
International Search Report for Application No. PCT/JP2009/068316 dated Jan. 26, 2010.

* cited by examiner

Primary Examiner — Melvin C Mayes
Assistant Examiner — Stefanie Cohen
(74) Attorney, Agent, or Firm — RatnerPrestia

(57) ABSTRACT

This invention provides fibers made from a thermoplastic cellulose ester composition, which can maintain excellent mechanical properties still after high temperature dyeing treatment, especially suitable as fibers mixed with polyester fibers or as fabrics woven or knitted together with polyester fibers, and also provides the thermoplastic cellulose ester composition constituting the fibers. For example, this invention provides a thermoplastic cellulose ester composition containing at least 70 to 95 wt % of a cellulose fatty acid mixed ester with an average substitution degree of 2.4 to 2.8, 5 to 25 wt % of a plasticizer and 1 to 10 wt % of a cellulose acetate with an average substitution degree of 2.3 to 2.6, and also provides fibers made from the thermoplastic cellulose ester composition.

4 Claims, No Drawings

US 8,444,757 B2

THERMOPLASTIC CELLULOSE ESTER COMPOSITION AND FIBERS MADE THEREFROM

CROSS-REFERENCE TO RELATED APPLICATIONS

This application is the U.S. National Phase application of PCT International Application No. PCT/JP2009/068316, filed Oct. 26, 2009, and claims priority of Japanese Patent Application No. 2008-278137, filed Oct. 29, 2008, the disclosures of such applications being incorporated herein by reference in their entirety for all purposes.

FIELD OF THE INVENTION

The present invention relates to fibers made from a thermoplastic cellulose ester composition capable of maintaining excellent mechanical properties still after high temperature dyeing treatment and especially suitable for forming fibers, knitted fabrics and woven fabrics mixed with polyester fibers, and also relates to the thermoplastic cellulose ester composition constituting the fibers.

BACKGROUND

Cellulose ester fibers made from a cellulose acetate, cellulose acetate propionate, etc. have excellent features which synthetic fibers such as polyester fibers and polyamide fibers do not have. That is, cellulose ester fibers have many properties such as excellent gloss, profound color tone, color developability, dry feeling and moisture absorbability/releasability as clothing fibers, and therefore have been used particularly for high quality clothing.

In recent years, consumers' needs in the clothing field are oriented toward diversification and higher quality, and in this situation, studies are being made to use the features of both cellulose ester fibers and synthetic fibers such as polyethylene terephthalate fibers, for providing higher value-added fibers having the excellent features of both the types of fibers.

Such high value-added fibers proposed include novel cellulose ester fibers obtained by melt spinning (see Patent Documents 1 to 3). Patent Document 1 proposes cellulose acetate propionate fibers excellent in color developability and fast-drying, and Patent Documents 2 and 3 propose cellulose fatty acid mixed ester fibers with excellent mechanical properties. However, these cellulose ester fibers proposed have a problem that they cannot be dyed together with polyethylene terephthalate (PET) fibers, etc. in the same bath, since if they are dyed at a high temperature of 120° C., they decline in fiber strength so greatly that they cannot withstand practical use any more. Therefore, since it is difficult to mix the cellulose fatty acid mixed ester fibers and PET fibers or the like for obtaining a composite material for clothing, they are mostly used alone, being limited in widening applications. For reference, in the examples of Patent Document 1, the dyeing temperature of cellulose fatty acid mixed ester fibers (cellulose acetate propionate) was 90° C., and the dyeing temperature of PET (comparative example) was 130° C., indicating that it is difficult to dye both types of fibers in the same bath.

Further, another document (see Patent Document 4) proposes a molded article obtained by blending two cellulose esters different in substitution degree. However, this proposal does not suggest at all that a thermoplastic cellulose ester composition suitable for melt spinning can be obtained by adding a plasticizer satisfying a certain requirement and a cellulose acetate and that the obtained fibers are enhanced in mechanical properties after high temperature dyeing treatment.

PATENT DOCUMENTS

Patent Document 1—JP 2004-169242 A
Patent Document 2—JP 2004-27378 A
Patent Document 3—JP 2004-182979 A
Patent Document 4—JP 2007-277582 A

SUMMARY OF THE INVENTION

This invention provides a thermoplastic cellulose ester composition capable of maintaining excellent mechanical properties still after high temperature dyeing treatment at such a temperature of 120° C. and especially suitable for forming fibers, knitted fabrics and woven fabrics mixed with polyester fibers, and also provides fibers made from the composition.

The inventors made an intensive study for solving the abovementioned problem, and as a result, succeeded in obtaining fibers that can maintain excellent mechanical properties still after high temperature dyeing treatment by forming fibers from a thermoplastic composition obtained by adding a specific cellulose acetate to a cellulose fatty acid mixed ester and a plasticizer.

The first aspect of the present invention provides a thermoplastic cellulose ester composition comprising at least 70 to 95 wt % of a cellulose fatty acid mixed ester with an average substitution degree of 2.4 to 2.8, 5 to 25 wt % of a plasticizer and 1 to 10 wt % of a cellulose acetate with an average substitution degree of 2.3 to 2.6.

In the second aspect of the present invention, the aforementioned cellulose fatty acid mixed ester can be a cellulose acetate propionate.

The third aspect of the present invention provides fibers formed of a thermoplastic cellulose ester composition containing at least 70 to 95 wt % of a cellulose fatty acid mixed ester with an average substitution degree of 2.4 to 2.8, 2 to 25 wt % of a plasticizer and 1 to 10 wt % of a cellulose acetate with an average substitution degree of 2.3 to 2.6.

The fourth aspect of the present invention provides a fibrous structure containing at least partially fibers formed of the aforementioned thermoplastic cellulose ester composition.

The fibers made from the thermoplastic cellulose ester composition have good mechanical properties capable of withstanding practical use still after high temperature dyeing treatment and can be suitably used as clothing fibers. Since the fibers made from the thermoplastic cellulose ester composition can maintain excellent mechanical properties still after high temperature dyeing treatment at such a temperature of 120° C., they are suitable for forming fibers, knitted fabrics and woven fabrics mixed with polyester fibers to be subjected to high temperature dyeing treatment.

DETAILED DESCRIPTION OF EMBODIMENTS OF THE INVENTION

The thermoplastic cellulose ester composition according to embodiments of this invention and the fibers made therefrom are explained below in detail.

It is preferred according to aspects of the invention that the thermoplastic cellulose ester composition contains at least 70 to 95 wt % of a cellulose fatty acid mixed ester with an average substitution degree of 2.4 to 2.8, 5 to 25 wt % of a plasticizer and 1 to 10 wt % of a cellulose acetate with an average substitution degree of 2.3 to 2.6.

The cellulose fatty acid mixed ester refers to a cellulose, in which three hydroxyl groups existing in each glucose unit are capped by two or more acyl groups. In view of the miscibility with the plasticizer added and the cellulose acetate as another component, thermoplasticity, fiber making operation efficiency, cost, etc., examples of the cellulose fatty acid mixed ester include a cellulose acetate propionate, cellulose acetate butyrate, cellulose acetate propionate butyrate, cellulose acetate hexanoate, cellulose acetate octanoate, cellulose acetate decanoate, etc. Among them, a cellulose acetate propionate can be preferably used.

The average substitution degree of the cellulose fatty acid mixed ester used in embodiments of this invention is 2.4 to 2.8. If the average substitution degree is kept in a range from 2.4 to 2.8, the thermoplasticity of the cellulose fatty acid mixed ester becomes good, and the cellulose fatty acid mixed ester can be stably formed into fibers by a melt spinning method. Further, in this case, it is excellent also in the miscibility with the cellulose acetate and good in kneadability and fiber making operation efficiency. It is more preferred that the average substitution degree of the cellulose fatty acid mixed ester is 2.5 to 2.7. Meanwhile the average substitution degree refers to the number of the hydroxyl groups to which acyl groups are chemically bound, among the three hydroxyl groups existing in each glucose unit of cellulose. The maximum average substitution degree is 3.0.

The content of the cellulose fatty acid mixed ester in the thermoplastic cellulose ester composition of embodiments of this invention is 70 to 95 wt %. If the cellulose fatty acid mixed ester content is less than 70 wt %, such features as the hygroscopicity and color developability of the cellulose fatty acid mixed ester are impaired. If the content is more than 95 wt %, thermal flowability becomes poor, making melt spinning difficult.

It is preferred in view of the mechanical properties of fibers, fiber making operation efficiency and the thermal decomposition resistance of the polymer, that the weight average molecular weight of the cellulose fatty acid mixed ester in the thermoplastic cellulose ester composition is 50,000 to 300,000. A more preferred range is 80,000 to 270,000, and a further more preferred range is 100,000 to 250,000.

The thermoplastic cellulose ester composition of embodiments of this invention contains a cellulose acetate in a range from 1 to 10 wt %. The effect of this invention can be exhibited by using a cellulose acetate satisfying a specific requirement. If fibers made from a composition, the main ingredient of which is a cellulose fatty acid ester not containing an acetate, are subjected to high temperature dyeing treatment, the fibrous structure is remarkably systematized to lower the mechanical properties after high temperature dyeing treatment.

On the other hand, the fibers made from the thermoplastic cellulose ester composition containing the cellulose acetate of this invention have good mechanical properties still after high temperature dyeing treatment. Compared with the melt viscosity of the cellulose fatty acid mixed ester existing as a main component of the thermoplastic cellulose ester composition of this invention, the melt viscosity of the cellulose acetate shows a very high value. Consequently in the case where fibers are formed by melt spinning, the thinning deformation behavior of the filaments of a composition containing a cellulose acetate takes place on the upstream side in the spinning line, compared with the thinning deformation behavior of the filaments of a composition not containing a cellulose acetate. Accordingly, in the region where the thinning deformation of the cellulose fatty acid mixed ester does not take place if there is no cellulose acetate, the thinning deformation of the cellulose fatty acid mixed ester is forced to take place if there is a cellulose acetate. As a result, the spinning stress of the fibers formed from the thermoplastic cellulose ester composition containing a cellulose acetate declines, and the obtained fibers are inhibited in the molecular orientation of the cellulose fatty acid mixed ester. Meanwhile, in the fibers made from a thermoplastic cellulose ester composition containing an acetate, the cellulose acetate is finely dispersed in the fibers on the order of nm. If the fibers are subjected to high temperature dyeing treatment, the cellulose acetate inhibits the ordering of the fibrous structure of the cellulose fatty acid mixed ester existing as a main component, and therefore as a result, good mechanical properties can be maintained still after high temperature dyeing treatment.

The thermoplastic cellulose ester composition of embodiments of this invention contains a cellulose acetate in a range from 1 to 10 wt %. If the content of the cellulose acetate is less than 1 wt %, the effect of holding the mechanical properties after high temperature dyeing treatment in the state of fibers is small. If the content is more than 10 wt %, the fiber making operation efficiency at the time of fiber formation is insufficient to make melt spinning difficult and to lower the mechanical properties. It is more preferred that the content of the cellulose acetate in the thermoplastic cellulose ester composition is 2 to 9 wt %, and a further more preferred range is 3 to 8 wt %.

The average substitution degree of the cellulose acetate used in embodiments of this invention is 2.3 to 2.6. In the case where the average substitution degree of the cellulose acetate satisfies the abovementioned range, the decline of the mechanical properties after high temperature dyeing treatment can be inhibited. Further, the miscibility with the cellulose fatty acid mixed ester becomes good, and the cellulose acetate is finely dispersed in the cellulose fatty acid mixed ester. Therefore, even if fibers are formed by melt spinning, the fiber making operation efficiency does not decline. The average substitution degree refers to the number of the hydroxyl groups to which acyl groups are chemically bound, among the three hydroxyl groups existing per each glucose unit of cellulose as described above, and the maximum average substitution degree is 3.0.

It is preferred that the average polymerization degree of the cellulose acetate used in this invention is 100 to 200. In the case where the average polymerization degree of the cellulose acetate satisfies the aforementioned range, if the thermoplastic cellulose ester composition is heated and melted, the thermal flowability of the cellulose acetate contained in the composition is enhanced, and the deformability at the time of fiber formation becomes sufficient. Accordingly the fiber making operation efficiency is stabilized without causing yarn breaking often, and further since the cellulose acetate is finely dispersed in the fibers on the order of nm, the mechanical properties of the spun yarn and the yarn after high temperature dyeing treatment also become good. It is more preferred that the average polymerization degree of the cellulose acetate is 120 to 180.

The content of the plasticizer in the thermoplastic cellulose ester composition of embodiments of this invention is 5.0 to 25.0 wt %. If the content of the plasticizer is 5.0 wt % or more, the melt viscosity of the composition can be decreased, and the fiber making operation efficiency of melt spinning becomes good. Further, if the content of the plasticizer is 25.0 wt % or less, the obtained fibers maintain the properties as the cellulose fatty acid mixed ester, and the capability of smoothly undergoing the subsequent steps can be enhanced without lowering the mechanical properties of the fibers. It is more preferred that the content of the plasticizer is 8.0 to 22.0 wt %, and a further more preferred range is 10.0 to 20.0 wt %.

Examples of the plasticizer contained in the thermoplastic cellulose ester composition of this invention include polyalkylene glycol-based compounds, glycerol-based compounds, caprolactone-based compounds, phthalic acid ester compounds, aliphatic dibasic acid esters, polyester-based compounds, epoxy-based compounds, phosphoric acid ester-based compounds and trimellitic acid ester-based compounds. Anyone of them can be used alone or two or more of them can also be used together. Especially polyalkylene glycol-based compounds, glycerol-based compounds, caprolactone-based compounds, phthalic acid ester compounds and aliphatic dibasic acid esters can be more preferably used for such reasons that they are good in the compatibility with the cellulose fatty acid mixed ester and the cellulose acetate as the components of the thermoplastic cellulose ester composition of this invention and that the thermoplasticization effect to allow melt spinning can be remarkably exhibited. Among them, a polyalkylene glycol-based compound that can be dissolved out using water or the like in the subsequent steps and does not cause fuming or the like at the time of melt spinning can be especially preferably used.

Particular examples of the polyalkylene glycol-based compounds include polyethylene glycol, polypropylene glycol and polybutylene glycol of preferably 200 to 4000 in weight average molecular weight. Any one of them can be used alone or two or more of them can also be used.

It is preferred that the thermoplastic cellulose ester composition of this invention contains a phosphite-based antioxidant, and as the phosphite-based antioxidant, a pentaerythritol-based compound can be especially preferably used. In the case where the thermoplastic cellulose ester composition contains a phosphite-based antioxidant, the effect of preventing the thermal decomposition of the cellulose fatty acid mixed ester is very remarkable in a high spinning temperature range and in a low discharge region, to inhibit the deterioration in the mechanical properties of fibers and to improve the color tone of the obtained fibers. It is preferred that the added amount of the phosphite-based antioxidant is 0.005 wt % to 0.500 wt % based on the weight of the thermoplastic cellulose ester composition.

Further, it is preferred that the thermoplastic cellulose ester composition of this invention has adequate thermal flowability for allowing stable melt spinning. The shear rate in the spin pack is as very low as 30 sec$^{-1}$ or less, and to allow stable melt spinning, it is preferred that the melt viscosity at a temperature of 260° C. and at a shear rate of 24 sec$^{-1}$ is in a range from 50 to 500 Pa·sec. A more preferred range is 100 to 450 Pa·sec. The melt viscosity at a temperature of 260° C. and at a shear rate of 24 sec$^{-1}$ is obtained using a capillary rheometer, and will be described in detail in the examples described later.

The thermoplastic cellulose ester composition of this invention may contain fine inorganic particles and organic compounds as a delustering agent, deodorant, flame retarder, yarn friction decreasing agent, coloration preventing agent, color pigment, dye, electrification control agent, antimicrobial agent, ultraviolet light absorber, infrared light absorber, crystal nucleating agent, fluorescent whitening agent, etc. to such an extent that the properties of the thermoplastic cellulose ester composition are not impaired.

The fibers made from the thermoplastic cellulose ester composition are explained below.

The fibers made from the thermoplastic cellulose ester composition of embodiments of this invention contain at least 70 to 95 wt % of a cellulose fatty acid mixed ester with an average substitution degree of 2.4 to 2.8, 5 to 25 wt % of a plasticizer and 1 to 10 wt % of a cellulose acetate with an average substitution degree of 2.3 to 2.6. The details of the cellulose fatty acid mixed ester, plasticizer and cellulose acetate constituting the fibers made from the thermoplastic cellulose ester composition of this invention are the same as those described before for the thermoplastic cellulose ester composition.

The fibers made from the thermoplastic cellulose ester composition of this invention, which have the abovementioned composition, can maintain excellent mechanical properties still after high temperature dyeing treatment. Fibers made from a conventional cellulose fatty acid mixed ester such as a cellulose acetate propionate are usually dyed at lower than 100° C. for inhibiting the decline of mechanical properties as can be seen, for example, in JP 2004-169242 A. Consequently, dyeing treatment of polyester fibers and the like at high temperature is difficult, and if they are subjected to high temperature dyeing treatment, they greatly decline in mechanical properties and therefore cannot withstand practical use any more. However, even if the fibers made from the thermoplastic cellulose ester composition of this invention are subjected to high temperature dyeing treatment, the decline of mechanical properties of the fibers can be inhibited. Accordingly, as a large feature, they can be used as a mixture with the fibers made from a polyester such as polyethylene terephthalate.

It is preferred that the fibers made from the thermoplastic cellulose ester composition after high temperature dyeing treatment have a strength of 0.5 cN/dtex or more and an elongation of 5% or more. In the case where the fibers satisfy the aforementioned values of strength and elongation, when the fibers are worn or used otherwise, they can sufficiently withstand practical use, and the decline of product quality level and the decline of durability in practical use do not occur. It is preferred that the strength after high temperature dyeing treatment is higher. More preferred is 0.6 cN/dtex or higher, and further more preferred is 0.7 cN/dtex or higher. Moreover, it is more preferred that the elongation is 10% or higher, and further more preferred is 15% or higher. Meanwhile, the high temperature dyeing treatment refers to the hot water treatment at a temperature of 120° C. assuming the dyeing temperature of polyester fibers for 60 minutes.

In the meantime, the content of the plasticizer in the fibers made from the thermoplastic cellulose ester composition of this invention can be determined, for example, by the following method. The plasticizer can be extracted by extraction treatment using water or an organic solvent, etc. Therefore, the weight obtained by subtracting the weight measured after the treatment from the weight measured before the treatment corresponds to the amount of the plasticizer contained in the composition. For example in the case where the plasticizer is a polyalkylene glycol, the amount of the plasticizer can be determined by a Soxhlet extraction method using methanol. As another method, determination can also be made by measuring the weight before the scouring step and the weight after the scouring step.

Further, the cellulose fatty acid mixed ester and the cellulose acetate can be separated from the fibers made from the thermoplastic cellulose ester composition of this invention by the following method using the difference between the solubilities of both the components in a solvent. That is, if methylene chloride or chloroform is used as the solvent, the cellulose fatty acid mixed ester can be dissolved in the solvent, and on the other hand, the cellulose acetate cannot be dissolved but settles. The mixture is filtered for solid liquid separation and subsequently the solvent is removed. As a result, the cellulose fatty acid mixed ester and the cellulose acetate can be separated from each other. After completion of separation, the weights of the respective components are measured to determine the contents of both the components in the composition.

As the method for producing the fibers made from the thermoplastic cellulose ester composition of this invention, for example, the following method can be employed.

That is, a composition containing a cellulose fatty acid mixed ester with an average substitution degree of 2.4 to 2.8, a plasticizer and a cellulose acetate with an average substitution degree of 2.3 to 2.6 is pelletized using a twin screw extruder or the like with the molding temperature kept in a range from 180 to 280° C. The thermoplastic cellulose ester composition may contain the aforementioned phosphite-based coloration preventing agent and may contain other resins and additives to such an extent that the purport of this invention is not distorted.

In this invention, it is preferred to dry the thermoplastic cellulose ester compound, to keep the water content of the composition at 0.3% or less before melt spinning. In the case where the water content is 0.3% or less, foaming by water does not occur during melt spinning, to allow stable spinning, and the mechanical properties of the fibers such as multi filaments obtained also become good. It is more preferred that the water content is 0.2% or less, and further more preferred is 0.1% or less.

In this invention, the thermoplastic cellulose ester composition can be melt-spun to obtain fibers. If melt spinning is performed, a sufficiently developed fibrous structure can be formed while the molten thermoplastic cellulose ester composition is cooled to be solidified. In addition, a small environmental load and excellent productivity are assured.

As the melt spinning method, dried pellets are melted, for example, by an extruder, metered by a metering pump, sent to the spin pack contained in a spin block, filtered in the pack, and subsequently discharged from a spinneret as filaments.

The spun filaments are once cooled and solidified by a cooling device and subsequently are given an oil solution by a lubricator, being taken up by first godet rolls, and wound by a winder via second godet rolls, to obtain a wound yarn. In order to enhance fiber making stability and mechanical properties, as required, a heating cylinder or thermally insulating cylinder of 2 to 20 cm may also be installed under the spinneret, or an entangling device may also be used for entangling.

It is preferred that the spinning temperature of melt spinning is in a range from 220° C. to 280° C. If the spinning temperature is 220° C. or higher, the elongation viscosity of the filaments discharged from the spinneret sufficiently declines, and the cyclic unevenness of short pitch caused by melt fracture (a phenomenon that streamline disturbance occurs if the shear stress of the polymer is high when it passes through the holes of the spinneret and that the filaments discharged from the spinneret become irregularly formed) does not appear, allowing uniform fibers to be obtained. Furthermore, since the filaments discharged from the spinneret are smoothly thinned, mechanical properties become good and moreover since the spinning tension is not excessively high, yarn breaking does not occur frequently to stabilize the fiber making operation efficiency. Further, if the spinning temperature is kept at 280° C. or lower, the thermal decomposition of the thermoplastic cellulose ester composition can be inhibited, and therefore the decline of mechanical properties caused by the decline of the molecular weight of the obtained fibers and the decline of the quality level by coloration do not occur. A more preferred range of the spinning temperature is 230° C. to 270° C.

It is preferred that the spinning speed is 500 m/min to 3000 m/min. If the spinning speed is kept at 500 m/min to 3000 m/min, a developed fibrous structure can be formed, and fibers with excellent mechanical properties can be obtained. A more preferred spinning speed range is 1000 m/min to 2500 m/min.

The wound fibers can also be drawn. Drawing allows the effect of improving the decline of strength at the time of high temperature dyeing treatment to be enhanced. For drawing, taken-up fibers can be once wound and subsequently drawn using rollers in a separate process, or the taken-up fibers can also be successively drawn without being wound. When drawing is performed, it is preferred to soften the fibers for allowing uniform drawing, and a publicly known method such as keeping the fibers continuously in contact with a heating roller or hot plate, for thermally softening the fibers can be suitably employed. In this case, it is preferred that the heating temperature is in a range from approx. 80 to approx. 180° C. for adequately softening the fibers without allowing the fibers to adhere to each other by fusion. A temperature range from 100 to 160° C. is more preferred. Further, since the fibers made from the thermoplastic cellulose ester composition of this invention can be softened in a wet state, it is also a preferred mode to keep the fibers in contact with hot water, an organic solvent or a water/organic solvent mixed solution. It is preferred that the drawing ratio is 1.03 to 1.70 times. If the drawing ratio is less than 1.03 times, the effect of improving the decline of strength at the time of high temperature dyeing treatment is small, and if the drawing ratio is 1.70 times or more, drawability becomes low due to yarn breaking, etc.

It is preferred that the fibers made from a thermoplastic cellulose ester composition obtained by the abovementioned method has a strength of 0.5 to 2.0 cN/dtex and an elongation of 10 to 60%. In the case where the strength is 0.5 cN/dtex or more, when the fibers used alone or mixed with the fibers of another material are twisted or falsely twisted in a subsequent process to produce yarns and or are woven or knitted in a subsequent process to produce a fabric, they are good in the capability to smoothly undergo the process or good in handling convenience. In view of good strength properties, a higher strength is preferred. More preferred is 0.6 cN/dtex or higher, and further more preferred is 0.7 cN/dtex or higher.

On the other hand, as for elongation, if the elongation is 10% or more, the fiber properties after high temperature dyeing treatment become good, and further at the time of spinning, the generation of fuzz can be inhibited. Furthermore, the capability of smoothly undergoing such steps as twisting, warping, weaving or knitting subsequently to the spinning step can be enhanced. Further, in order to inhibit the deformation of fibers at low stress and in order to prevent dyeing defects of the final product such as tight weft during weaving, an elongation of 60% or less is preferred. A more preferred elongation range is 15 to 55%, and a further more preferred range is 20 to 50%.

It is preferred that the fineness variation (U %) is 1.5% or less. The fineness variation (U %) is an indicator of thickness irregularity in the longitudinal direction of fibers and can be obtained by Uster Tester produced by Zellweger Uster. A fineness variation (U %) of 1.5% or less indicates that the uniformity in the longitudinal direction of fibers is excellent, and when the fibers are woven or knitted, fuzz and yarn breaking are unlikely to occur. Further, even if the fibers are dyed, such defects as partially strong dyeing and dye streaks do not occur, and a woven or knitted fabric with a high quality level can be obtained. It is preferred that the fineness variation (U %) is smaller. More preferred is 1.3% or less, and furthermore preferred is 1.0% or less. The measuring conditions of fineness variation (U %) will be explained later in detail for the examples.

The single fiber fineness can be arbitrarily set in response to required properties. With regard to the cross sectional form of a single fiber, for example, a circle, ellipsoid, polygon such as triangle or square, or an irregular sectional form such as flat or hollow form, or the like can be employed. Further, also with regard to the modes of fibers, monofilaments, multifilaments, staples, etc. can also be employed.

From the fibers obtained by spinning or from the fibers obtained by spinning and drawing, the plasticizer can also be dissolved out in order to further enhance the features of the cellulose fatty acid mixed ester fibers and in order to enhance the handling convenience of the product by obtaining a more highly durable product and achieving a higher thermal softening temperature. All the plasticizer can be dissolved out, but even if the plasticizer is dissolved out only partially, the features of the cellulose fatty acid mixed ester fibers and the handling convenience of the product can be enhanced. In the case where the plasticizer is dissolved out, the amount of the plasticizer contained in the fibers made from the thermoplastic cellulose ester composition in the final product obtained after dyeing treatment is suitably in a range from 0 to 25 wt %.

The removal of the plasticizer by dissolving can be performed in succession to the spinning or drawing process, but can also be performed in the state of a package after the fibers are once wound. Furthermore, the plasticizer can also be extracted in the state of a woven, knitted or nonwoven fabric. As for the extraction method, in view of industrial simplicity, it is preferred to bring a solvent of the plasticizer such as warm water, hot water or an organic solvent into contact with the fibers. A solvent with water as a main component is preferred in view of environment load reduction. The temperature and time period for extraction cannot be generally decided, since they depend on the plasticizer used and the added amount of the plasticizer. However, the inventors found that it is preferred to treat at a temperature of approx. 20 to approx. 90° C. for approx. 1 second to approx. 120 minutes.

The fibers made from the thermoplastic cellulose ester composition of this invention allow the decline of the mechanical properties thereof to be inhibited even if they are subjected to high temperature dyeing treatment. Consequently they can be used as a mixture with polyester fibers such as polyethylene terephthalate fibers. The methods of mixing with the other fibers include mere mixing with the other fibers, spinning together with the other fibers, knitting together with the other fibers, weaving together with the other fibers, etc.

The fabric such as a woven or knitted fabric formed of the fibers made from the thermoplastic cellulose ester composition of this invention can be obtained by weaving or knitting the abovementioned fibers by a conventional method, but when the fabric is formed, it is preferred to use the fibers made from the thermoplastic cellulose ester composition as a component. In the case where the fabric consists of multiple types of fibers, it is preferred to keep the content of the fibers made from the thermoplastic cellulose ester composition at the largest or second largest among the multiple types of the fibers constituting the fabric.

An example of the fabric formed of multiple types of fibers is a woven or knitted fabric mixed with elastic fibers such as polyurethane fibers for having drawability. Further, a woven fabric using the fibers made from the thermoplastic cellulose ester composition as warp yarns only or weft yarns only, or the fibers made from the thermoplastic cellulose ester composition can also be twisted or combined together with natural fibers such as cotton, silk, hemp or wool, or regenerated fibers or chemical fibers such as rayon or cellulose acetate, or synthetic fibers made from polyethylene terephthalate, polypropylene terephthalate, polybutylene terephthalate, nylon, acryl, vinylon, polyolefin or polyurethane, etc.

Stitches of knitted fabrics include weft knits such as plain stitch, rib stitch, pearl stitch and interlock stitch and warp knits such as tricot. In the case of a knitted fabric, knitting is followed by scouring, as required heat setting, dyeing and finish setting. Further, weaves include plain weave, twill weave, satin weave, etc. In the case of a woven fabric, warping is followed by sizing, weaving, scouring, as required heat setting, dyeing and finish setting. Further, before these steps, preliminary steps of false twisting, fluid jetting, etc. can also be performed for making the fibers bulky.

As dyeing methods, such methods as cheese dyeing, jet dyeing and drum dyeing can be employed. As dyes, disperse dyes for acetates and polyesters can be suitably used. If the dyeing temperature is in a range from 80 to 140° C., fibers or a fabric excellent in mechanical properties and color developability can be obtained. As machines used for dyeing, usually used publicly known dyeing machines such as a cheese dyeing machine for dyeing fibers, jet dyeing machine for dying a fabric, wince dyeing machine, jigger, beam dyeing machine and drum dyeing machine for dyeing garments can be used.

EXAMPLES

This invention is illustrated below in more detail in reference to examples. The respective property values in the examples were obtained according to the following methods.

A. Average Substitution Degree of Cellulose Fatty Acid Mixed Ester

Zero point nine gram of a cellulose fatty acid mixed ester dried at a temperature of 80° C. for 8 hours was weighed, and 35 ml of acetone and 15 ml of dimethyl sulfoxide were added for dissolving the ester, and further 50 ml of acetone was added. With stirring, 30 ml of 0.5N sodium hydroxide aqueous solution was added to the mixture, to perform saponification treatment for 2 hours. Then, 50 ml of hot water was added to the solution, and the lateral face of a flask was washed. Subsequently titration was performed using phenolphthalein indicator and 0.5N sulfuric acid. Separately a blank test was performed according to the same method as used for the abovementioned sample. After completion of titration, the supernatant solution was diluted to 100 times, and ion chromatography was used to measure the composition of organic acids. From the result of measurement and the result of acid composition analysis by ion chromatography, the average substitution degrees of the cellulose fatty acid mixed ester were calculated from the following formulae.

$$TA=(B-A) \times F/(1000 \times W)$$

$$DSace=(162.14 \times TA)/[\{1-(Mwace-(16.00+1.01)) \times TA\}+\{1-(Mwacy-(16.00+1.01)) \times TA\} \times (Acy/Ace)]$$

$$DSacy=DSace \times (Acy/Ace)$$

In the abovementioned formulae:
TA: Total amount of organic acids (ml)
A: Titer of the sample (ml)
B: Titer of the blank test (ml)
F: Strength of sulfuric acid
W: Weight of the sample (g)
DSace: Average substitution degree by acetyl groups DSacy: Average substitution degree by acyl groups
Mwace: Molecular weight of acetic acid
Mwacy: Molecular weight the other organic acid
Acy/Ace: Molar ratio of acetic acid (Ace) to the other organic acid (Acy)
162.14: Molecular weight of the recurring unit of cellulose
16.00: Atomic weight of oxygen
1.01: Atomic weight of hydrogen B. Average Substitution Degree of a Cellulose Acetate The average substitution degree of a cellulose acetate was calculated from the following formula after obtaining the oxidation degree of the cellulose acetate.

$$\text{Average substitution degree} = (\text{Oxidation degree} \times 3.86)/(142.9 - \text{Oxidation degree})$$

The oxidation degree can be measured according to the oxidation degree measuring method of ASTM D-817-91 (Test Method of Testing Cellulose Acetate, Etc.) At first, 1.9 g of a dried cellulose acetate was accurately weighed, and dissolved into 150 ml of a mixed solvent consisting of acetone and dimethyl sulfoxide (ratio by volume 4:1). Subsequently 30 ml of 1N sodium hydroxide aqueous solution was added for saponification at 25° C. for 2 hours. Then, phenolphthalein solution was added as an indicator, and 1N sulfuric acid was used to titrate excessive sodium hydroxide. Then, the oxidation degree was calculated from the following formula. Meanwhile, according to the same method, a blank test was performed. Oxidation degree (%)=[6.005×(B−A)×F]/W (in the formula, A denotes the amount of 1N sulfuric acid in ml used for titrating the sample; B denotes the amount of 1N sulfuric acid in ml used for titrating the blank test; F denotes the concentration factor of 1N sulfuric acid; and W denotes the weight of the sample).

C. Measurement of the Weight Average Molecular Weight of a Cellulose Fatty Acid Mixed Ester A sample was perfectly dissolved in tetrahydrofuran, and the solution and Gel Permeation Chromatography 2690 produced by Waters were used to calculate the weight average molecular weight in terms of polystyrene.

D. Melt Viscosity

The value measured at a temperature of 260° C. and at a shear rate of 24 sec$^{-1}$ (head speed 2 mm/min) using Capillograph 1B produced by Toyo Seiki Seisaku-sho, Ltd. and a die of L=40 mm and D=1 mm was employed as the melt viscosity [Pa·sec]. The pellets measured were dried in vacuum at a temperature of 80° C. for 8 hours before measurement, and the measurement was performed within 10 minutes after start of packing the pellets to avoid the influence of the thermal decomposition of the composition at the time of measurement.

E. Strengths and Elongations of a Spun Yarn and a Drawn Yarn

A tensile test was performed in an environment of 20° C. temperature and 65% humidity at a sample length of 20 cm and at a stress rate of 20 cm/min using Autograph AG-50NISMS produced by Shimadzu Corporation, and the value obtained by dividing the stress [cN] at the point showing the largest load by the initial fineness [dtex] was identified as the tensile strength [cN/dtex]. Further, the elongation at this time was identified as the elongation [%]. Measurement was performed five times, and the mean values were employed as the strength and the elongation.

F. Strengths and Elongations Before and after High Temperature Dyeing Treatment

The fibers obtained by spinning were used to form a tubular knitted fabric using a tubular knitting machine (Model No. NCR-BL, cylinder diameter 3.5 inches, 300 needles) produced by Eiko Industrial Co., Ltd. The obtained tubular knitted fabric (approx. 15 cm long) was treated by scouring. In the case where the fibers contained a water soluble plasticizer at the time of treatment, the plasticizer was dissolved out. Subsequently, high temperature dyeing treatment was performed at a temperature of 120° C. for 60 minutes, assuming the dyeing conditions of polyester fibers. For measuring the strength and elongation before high temperature dyeing treatment (after scouring treatment) and after high temperature dyeing treatment, the tubular knitted fabric was decomposed to take out fibers, and measurement was performed as described in section D above.

G. Fineness Variation (U %)

U % (half mode) was measured under the following conditions using Uster Tester 4-CX produced by Zellweger Uster. Measurement was performed five times, and the mean value was employed as U %.

Measuring speed: 200 m/min
Measuring time: 2.5 minutes
Length of measured fibers: 500 m
Twist: S twist, 12000/m H. Evaluation of Fiber Making Operation Efficiency When fibers were produced from a thermoplastic cellulose ester composition, the fiber making operation efficiency for obtaining 10 kg of fibers was evaluated according to the following criterion. A double-circle mark or a single-circle mark means that the fibers are acceptable.

Double-circle mark: Yarn breaking did not occur at all (fiber making operation efficiency is very good).
Single-circle mark: Yarn breaking occurred once or twice (fiber making operation efficiency is good).
Cross mark: Yarn breaking occurred 3 times or more (fiber making operation efficiency is poor).

Production Example 1

Two hundred and forty parts by weight of acetic acid and 67 parts by weight of propionic acid were added to 100 parts by weight of cellulose (cotton linter), and the mixture was mixed at a temperature of 50° C. for 30 minutes. The obtained mixture was cooled to room temperature (20° C.) and subsequently 172 parts by weight of acetic anhydride and 168 parts by weight of propionic anhydride respectively cooled in an ice bath as esterifying agents and 4 parts by weight of sulfuric acid as an esterifying catalyst were added. The mixture was stirred for 150 minutes to perform esterification reaction. In the esterification reaction, when the temperature exceeded 40° C., the reaction mixture was cooled in a water bath. After completion of reaction, a mixed solution consisting of 100 parts by weight of acetic acid and 33 parts by weight of water was added as a reaction terminator, taking 20 minutes, to hydrolyze the excessive anhydrides. Then, 333 parts by weight of acetic acid and 100 parts by weight of water were added, and the mixture was heated and stirred at a temperature of 80° C. for 1 hour. After completion of reaction, an aqueous solution containing 6 parts by weight of sodium carbonate was added, and the precipitated cellulose acetate propionate was collected by filtration and in succession washed with water, then being dried at a temperature of 60° C. for hours. The average substitution degrees of the obtained cellulose acetate propionate (CAP) by acetyl groups and propionyl groups were 1.9 and 0.7 respectively, and the weight average molecular weight was 172,000.

Eighty one point five wt % of the CAP obtained in this manner, 18.4 wt % of polyethylene glycol with an average molecular weight of 600 (PEG600) and 0.1 wt % of bis(2,6-di-t-butyl-4-methylphenyl) pentaerythritol diphosphite as a phosphorus-based antioxidant were kneaded using a double screw extruder at a temperature of 240° C., and the obtained gut was cut to approximately 5 mm, to obtain pellets of a thermoplastic cellulose ester composition.

Working Example 1

The CAP/PEG600/antioxidant composition obtained in Production Example 1 and a cellulose acetate/diethyl phthalate (63/37) composition ("Acety (grade 37%)" produced by Daicel FineChem. Ltd., average substitution degree of cellulose acetate 2.4, average polymerization degree 140) were mixed at the ratio by weight shown in Table 1, and the mixture was used as the composition to be spun. The mixture was dried in vacuum at a temperature of 80° C. for 12 hours (water content after drying, 450 ppm), and subsequently supplied into a double screw extruder, to be molten, then being discharged from a spinneret (discharge hole diameter 0.23 mm, hole length 0.46 mm) at a spinning temperature of 260° C., to obtain filaments. The filaments were cooled by air with a temperature of 20° C. at an air velocity of 0.5 m/sec and given an oil solution by a lubricator, to be bundled, then being taken up by first godet rollers (spinning speed 1500 m/min) and wound by a winder via second godet rollers rotating at the same speed as that of the first godet rollers. The fiber making operation efficiency was evaluated. The yarn breaking did not occur at all, to show very good fiber making operation efficiency.

The obtained fibers (description of the spun yarn: 100 decitexes—24 filaments) had a strength of 0.75 cN/dtex and an elongation of 48.2%, showing good properties.

Then, the fibers were used to form a tubular knitted fabric using a tubular knitting machine produced by Eiko Industrial Co., Ltd. The obtained tubular knitted fabric was treated by scouring at a temperature of 70° C. for 15 minutes, and at this time, all the amount of PEG600 contained as a water soluble plasticizer in the fibers was dissolved out. Subsequently, high temperature water treatment was performed at a temperature of 120° C. for 60 minutes. After completion of high temperature water treatment, the fibers had a strength of 1.08 cN/dtex and an elongation of 19.0%, showing that good properties were maintained.

Working Examples 2 and 3

Spinning was performed as described in Working Example 1, except that the ratio by weight of the CAP/PEG600/antioxidant composition obtained in Production Example 1 and the cellulose acetate/diethyl phthalate (63/37) composition ("Acety (grade 37%)" produced by Daicel FineChem. Ltd.) was changed to the ratio by weight shown in Table 1.

The fibers obtained in Working Example 2 (description of the spun yarn: 100 decitexes—24 filaments) had a strength of 0.55 cN/dtex and an elongation of 53.9%, showing good properties. The fibers were used to form a tubular knitted fabric under the same conditions as in Working Example 1, and in succession scoured and subjected to high temperature water treatment. After completion of high temperature water treatment, the fibers had a strength of 0.87 cN/dtex and an elongation of 22.1%, showing that good properties were maintained. With regard to the fiber making operation efficiency, yarn breaking did not occur at all to show very good fiber making operation efficiency.

Further, the fibers obtained in Working Example 3 (description of the spun yarn: 100 decitexes—24 filaments) had a strength of 0.95 cN/dtex and an elongation of 34.6%, showing good properties. The fibers were used to form a tubular knitted fabric under the same conditions as in Working Example 1, and in succession scoured and subjected to high temperature water treatment. After completion of high temperature water treatment, the fibers had a strength of 1.24 cN/dtex and an elongation of 7.5%, showing that good properties were maintained. With regard to the fiber making operation efficiency, yarn breaking did not occur at all, to show very good fiber making operation efficiency.

Working Example 4

A cellulose acetate propionate (CAP482-20, substitution degree 2.7 (average substitution degree by acetyl groups 0.2, average substitution degree by propionyl groups 2.5), weight average molecular weight 185,000) produced by Eastman Chemical, a cellulose acetate (type L-40, average substitution degree 2.4, average polymerization degree 160) produced by Daicel Chemical Industries, Ltd., polyethylene glycol with an average molecular weight of 600 (PEG600), and bis(2,6-di-t-butyl-4-methylphenyl) pentaerythritol diphosphite as a phosphorus-based antioxidant were kneaded at the ratio by weight shown in Table 1 and at a temperature of 230° C. using a double screw extruder, and the obtained gut was cut to approximately 5 mm, to obtain pellets of a thermoplastic cellulose ester composition.

The pellets of the mixture were dried in vacuum at a temperature of 80° C. for 12 hours (water content after drying, 510 ppm), subsequently supplied into a double screw extruder, to be molten, then being discharged from a spinneret (discharge hole diameter 0.18 mm, hole length 0.54 mm) at a spinning temperature of 265° C., to obtain filaments. The filaments were cooled by air with a temperature of 20° C. at an air velocity of 0.5 m/sec, and given an oil solution by a lubricator, to be bundled, then being taken up by first godet rollers (spinning speed 1000 m/min) and wound by a winder via second godet rollers rotating at the same speed as that of the first godet rollers. The fiber making operation efficiency was evaluated. Yarn breaking did not occur at all to show very good fiber making operation efficiency.

The obtained fibers (description of the spun yarn: 100 decitexes—48 filaments) had a strength of 0.86 cN/dtex and an elongation of 38.0%, showing good properties.

Then, the fibers were used to form a tubular knitted fabric using a tubular knitting machine produced by Eiko Industrial Co., Ltd. The obtained tubular knitted fabric was treated by scouring at a temperature of 70° C. for 15 minutes, and at this time, all the amount of PEG600 as a water soluble plasticizer contained in the fibers was dissolved out. Subsequently the fibers were subjected to high temperature water treatment at a temperature of 120° C. for 60 minutes. After completion of high temperature water treatment, the fibers had a strength of 1.22 cN/dtex and an elongation of 10.1%, showing that good properties were maintained.

Working Example 5

Pellets of a thermoplastic cellulose ester composition were obtained according to the same method as that of Working Example 4, except that the ratio of the cellulose fatty acid mixed ester, cellulose acetate and plasticizer was changed to the ratio shown in Table 1. The pellets were dried in vacuum at a temperature of 80° C. for 12 hours (water content after drying, 600 ppm), and supplied into a double screw extruder, to be molten, then being discharged from a spinneret (discharge hole diameter 0.25 mm, hole length 0.5 mm) at a spinning temperature of 250° C., to obtain filaments. The filaments were cooled by air with a temperature of 20° C. at an air velocity of 0.5 m/sec, and given an oil solution by a lubricator, to be bundled, then being taken up by first godet rollers (spinning speed 2500 m/min), and wound by a winder via second godet rollers rotating at the same speed as that of the first godet rollers. The fiber making operation efficiency was evaluated. Yarn breaking occurred twice, to show good fiber making operation efficiency.

The obtained fibers (description of the spun yarn: 100 decitexes—12 filaments) had a strength of 0.92 cN/dtex and an elongation of 36.10, showing good properties.

Then, the fibers were used to form a tubular knitted fabric using a tubular knitting machine produced by Eiko Industrial Co., Ltd. The obtained tubular knitted fabric was treated by scouring at a temperature of 50° C. for 30 minutes, and at this time, all the amount of PEG600 contained as a water soluble plasticizer in the fibers was dissolved out. Subsequently, the fibers were subjected to high temperature water treatment at a temperature of 120° C. for 60 minutes. After completion of high temperature water treatment, the fibers had a strength of 1.05 cN/dtex and an elongation of 21.1%, showing that good properties were maintained.

Production Example 2

A cellulose acetate propionate (CAP) with an average substitution degree by acetyl groups of 1.7 and an average substitution degree by propionyl groups of 0.8 was obtained (weight average molecular weight 172,000) by changing the amounts of the esterifying agents in Production Example 1.

Working Example 6

The cellulose acetate propionate of Production Example 2, the cellulose acetate (type L-40, average substitution degree 2.4, average polymerization degree 160) produced by Daicel Chemical Industries, Ltd., polyethylene glycol with an average molecular weight of 600 (PEG600), bis(2,6-di-t-butyl-4-methylphenyl) pentaerythritol diphosphite (0.1 wt %) as a phosphorus-based antioxidant, and titanium dioxide (0.3 wt %) as a delustering agent were kneaded at the ratio by weight shown in Table 1 and at a temperature of 240° C. using a double screw extruder, and the obtained gut was cut to approximately 5 mm, to obtain pellets of a thermoplastic cellulose ester composition.

The pellets were dried in vacuum at a temperature of 80° C. for 12 hours (water content after drying, 410 ppm), and subsequently supplied into a double screw extruder, to be molten, then being discharged from a spinneret (discharge hole diameter 0.2 mm, hole length 0.4 mm) at a spinning temperature of 255° C., to obtain filaments. The filaments were cooled by air with a temperature of 20° C. at an air velocity of 0.5 m/sec, and given an oil solution by a lubricator, to be bundled, then being taken up by first godet rollers (spinning speed 2000 m/min), and wound by a winder via second godet rollers rotating at the same speed as that of the first godet rollers. The fiber making operation efficiency was evaluated. Yarn breaking occurred once, to show good fiber making operation efficiency. The obtained fibers (description of the spun yarn: 100 decitexes—36 filaments) had a strength of 0.80 cN/dtex and an elongation of 42.6%, showing good properties.

Then, the fibers were used to form a tubular knitted fabric using a tubular knitting machine produced by Eiko Industrial Co., Ltd. The obtained tubular knitted fabric was treated by scouring at a temperature of 80° C. for 20 minutes, and at this time, all the amount of PEG600 contained as a water soluble plasticizer in the fibers was dissolved out. Subsequently the fibers were subjected to high temperature water treatment at a temperature of 120° C. for 60 minutes. After completion of high temperature water treatment, the fibers had a strength of 0.95 cN/dtex and an elongation of 26.1%, showing that good properties were maintained.

TABLE 1-1

| | | | Working Example 1 | Working Example 2 | Working Example 3 | Working Example 4 | Working Example 5 | Working Example 6 |
|---|---|---|---|---|---|---|---|---|
| Composition to be melt-spun | Cellulose fatty acid mixed ester | Name of the compound | CAP | CAP | CAP | CAP | CAP | CAP |
| | | Substitution degree | 2.6 | 2.6 | 2.6 | 2.7 | 2.7 | 2.5 |
| | | Content [wt %] | 77.6 | 76.2 | 79.1 | 90.0 | 75.5 | 70.5 |
| | Cellulose acetate | Substitution degree | 2.5 | 2.5 | 2.5 | 2.4 | 2.4 | 2.4 |
| | | Average polymerization degree | 140 | 140 | 140 | 160 | 160 | 160 |
| | | Content [wt %] | 3.0 | 4.1 | 1.8 | 2.0 | 9.5 | 5.5 |
| | Plasticizer | Name of the compound | PEG600 DEP | PEG600 DEP | PEG600 DEP | PEG600 | PEG600 | PEG600 |
| | | Content [wt %] | 19.3 (1.8 of DEP) | 19.6 (2.4 of DEP) | 19.0 (1.1 of DEP) | 7.9 | 14.9 | 23.6 |
| | Other additive | Name of the compound | Antioxidant | Antioxidant | Antioxidant | Antioxidant | Antioxidant | Antioxidant TiO$_2$ |
| | | Content [wt %] | 0.1 | 0.1 | 0.1 | 0.1 | 0.1 | 0.4 |
| | Melt viscosity [Pa · sec] | | 335 | 351 | 328 | 224 | 189 | 300 |
| Fiber properties | Spun yarn or stretched yarn | Strength [cN/dtex] | 0.75 | 0.55 | 0.95 | 0.86 | 0.92 | 0.80 |
| | | Elongation [%] | 48.2 | 53.9 | 34.6 | 38.0 | 36.1 | 42.6 |
| | | Single fiber fineness [dtex] | 4.2 | 4.2 | 4.2 | 2.1 | 8.3 | 2.8 |
| | | U % | 0.8 | 1.0 | 0.6 | 1.3 | 0.6 | 1.1 |
| | Before high temperature water treatment | Strength [cN/dtex] | 1.13 | 0.92 | 1.36 | 1.28 | 1.10 | 1.00 |
| | | Elongation [%] | 37.1 | 42.0 | 30.1 | 33.3 | 35.3 | 39.3 |
| | After high temperature water treatment | Strength [cN/dtex] | 1.08 | 0.87 | 1.24 | 1.22 | 1.05 | 0.95 |
| | | Elongation [%] | 19.0 | 22.1 | 7.5 | 10.1 | 21.1 | 26.1 |
| Fiber making operation efficiency | | | ◎ | ◎ | ◎ | ◎ | ○ | ○ |

CAP: Cellulose acetate propionate
PEG600: Polyethylene glycol (average molecular weight 600)
DEP: Diethyl phthalate

Working Example 7

The fibers obtained by spinning in Working Example 1 were drawn at a preheating temperature of 140° C., at a setting temperature of 160° C., at a drawing ratio of 1.10 times and at a drawing speed of 200 m/min, to obtain a drawn yarn. The obtained drawn yarn had a strength of 0.89 cN/dtex and an elongation of 34.2%, showing good properties. Then, the drawn yarn obtained like this was used to form a tubular knitted fabric as described in Working Example 1, and the fabric was treated by scouring and subjected to high temperature water treatment. After completion of high temperature water treatment, the fibers had a strength of 1.15 cN/dtex and an elongation of 15.3%, showing that good properties were maintained.

Working Example 8

Seventy seven wt % of the cellulose acetate propionate obtained in Production Example 1, 5 wt % of a cellulose acetate (type L-70, average substitution degree 2.4, average polymerization degree 180) produced Daicel Chemical Industries, Ltd., 17.9 wt % of polyethylene glycol with an average molecular weight of 600 (PEG600) and 0.1 wt % of bis(2,6-di-t-butyl-4-methylphenyl) pentaerythritol diphosphite as a phosphorus-based antioxidant were kneaded at a temperature of 250° C. using a double screw extruder, and the obtained gut was cut to approximately 5 mm, to obtain pellets of a thermoplastic cellulose ester composition.

The pellets of the mixture were dried in vacuum at a temperature of 80° C. for 12 hours (water content after drying, 440 ppm), and supplied into a double screw extruder, to be molten, then being discharged from a spinneret (discharge hole diameter 0.23 mm, hole length 0.60 mm) at a spinning temperature of 260° C., to obtain filaments. The filaments were cooled by air with a temperature of 20° C. at an air velocity of 0.5 m/min, and given an oil solution by a lubricator, to be bundled, then being taken up by first godet rollers (spinning speed 1500 m/min), and wound by a winder via second godet rollers rotating at the same speed as that of the first godet rollers. The fiber making operation efficiency was evaluated. Yarn breaking did not occur at all, to show very good fiber making efficiency.

The obtained filaments (description of the spun yarn: 100 decitexes—24 filaments) had a strength of 1.06 cN/dtex and an elongation of 31.5%, showing good properties.

Then, the fibers were used to form a tubular knitted fabric using a tubular knitting machine produced by Eiko Industrial Co., Ltd. The obtained tubular knitted fabric was treated by scouring at a temperature of 70° C. for 15 minutes, and at this time, all the amount of PEG600 contained as a water soluble plasticizer in the fibers was dissolved out. Subsequently the fibers were subjected to high temperature water treatment at a temperature of 120° C. for 60 minutes. After completion of high temperature water treatment, the fibers had a strength of 1.26 cN/dtex and an elongation of 10.1%, showing that good properties were maintained.

Working Example 9

Seventy seven wt % of the cellulose acetate propionate obtained in Production Example 1, 5 wt % of a cellulose acetate (type L-20, average substitution degree 2.4, average polymerization degree 140) produced by Daicel Chemical Industries, Ltd., 17.9 wt % of polyethylene glycol with an average molecular weight of 600 (PEG 600) and 0.1 wt % of bis(2,6-di-t-butyl-4-methylphenyl) pentaerythritol diphosphite as a phosphorus-based antioxidant were kneaded at a temperature of 250° C. using a double screw extruder, and the obtained gut was cut to approximately 5 mm, to obtain pellets of a thermoplastic cellulose ester composition.

The pellets of the mixture were dried in vacuum at a temperature of 80° C. for 12 hours (water content after drying, 390 ppm), and subsequently supplied into a double screw extruder, to be molten, then being discharged from a spinneret (discharge hole diameter 0.23 mm, hole length 0.60 mm) at a spinning temperature of 260° C., to obtain filaments. The filaments were cooled by air with a temperature of 20° C. at an air velocity of 0.5 m/sec., and given an oil solution by a lubricator, to be bundled, then being taken up by first godet rollers (spinning speed 1500 m/min), and wound by a winder via second godet rollers rotating at the same speed as that of the first godet rollers. The spinning and drawing operation efficiency was evaluated. Yarn breaking did not occur at all, to show very good fiber making operation efficiency.

The obtained fibers (description of the spun yarn: 200 decitexes—48 filaments) had a strength of 0.73 cN/dtex and an elongation of 28.1%, showing good properties.

Then, the fibers were used to form a tubular knitted fabric using a tubular knitting machine produced by Eiko Industrial Co., Ltd. The obtained tubular knitted fabric was treated by scouring at a temperature of 70° C. for 15 minutes, and at this time, all the amount of PEG600 contained as a water soluble plasticizer in the fibers was dissolved out. Subsequently the fibers were subjected to high temperature water treatment at a temperature of 120° C. for 60 minutes. After completion of high temperature water treatment, the fibers had a strength of 0.98 cN/dtex and an elongation of 7.6%, showing that good properties were maintained.

Working Example 10

Seventy seven wt % of the cellulose acetate propionate obtained in Production Example 1, 5 wt % of a cellulose acetate (type L-30, average substitution degree 2.4, average polymerization degree 150) produced by Daicel Chemical Industries, Ltd., 17.9 wt % of polyethylene glycol with an average molecular weight of 600 (PEG600) and 0.1 wt % of bis(2,6-di-t-butyl-4-methylphenyl) pentaerythritol diphosphite as a phosphorus-based antioxidant were kneaded at a temperature of 250° C. using a double screw extruder, and the obtained gut was cut to approximately 5 mm, to obtain pellets of a thermoplastic cellulose ester composition.

The pellets of the mixture were dried in vacuum at a temperature of 80° C. for 12 hours (water content after drying, 370 ppm), and subsequently supplied into a double screw extruder, to be molten, then being discharged from a spinneret (discharge hole diameter 0.23 mm, hole length 0.60 mm) at a spinning temperature of 260° C., to obtain filaments. The filaments were cooled by air with a temperature of 20° C. at an air velocity of 0.5 m/sec, and given an oil solution by a lubricator, then being taken up by first godet rollers (spinning speed 1500 m/min), and wound by a winder via second godet rollers rotating at the same speed as that of the first godet rollers. The fiber making operation efficiency was evaluated. Yarn breaking did not occur at all, to show very good fiber making operation efficiency.

The obtained fibers (description of the spun yarn: 100 decitexes—24 filaments) had a strength of 0.99 cN/dtex and an elongation of 33.8%, showing good properties.

Then, the fibers were used to form a tubular knitted fabric using a tubular knitting machine produced by Eiko Industrial Co., Ltd. The obtained tubular knitted fabric was treated by scouring at a temperature of 70° C. for 15 minutes, and at this time, all the PEG600 contained as a water soluble plasticizer in the fibers was dissolved out. Subsequently the fibers were subjected to high temperature water treatment at a temperature of 120° C. for 60 minutes. After completion of high temperature water treatment, the fibers had a strength of 1.18 cN/dtex and an elongation of 7.8%, showing that good properties were maintained.

Working Example 11

Seventy six wt % of a cellulose acetate butyrate (CAB171-15, average substitution degree by acetyl groups 2.0, average substitution degree by butyryl groups 0.7) produced by Eastman Chemical, 3 wt % of a cellulose acetate (type L-70, average substitution degree 2.4, average polymerization degree 180) produced by Daicel Chemical Industries, Ltd., 20.8 wt % of polyethylene glycol with an average molecular weight of 600 (PEG600) and 0.2 wt % of bis(2,6-di-t-butyl-4-methylphenyl)pentaerythritol diphosphite as a phosphorus-based antioxidant were kneaded at a temperature of 240° C. using a double screw extruder, and the obtained gut was cut to approximately 5 mm, to obtain pellets of a thermoplastic cellulose ester composition.

The pellets of the mixture were dried in vacuum at a temperature of 80° C. for 12 hours (water content after drying, 300 ppm), and subsequently supplied into a double screw extruder, to be molten, then being discharged from a spinneret (discharge hole diameter 0.23 mm, hole length 0.60 mm) at a spinning temperature of 260° C., to obtain filaments. The filaments were cooled by air with a temperature of 20° C. at an air velocity of 0.5 m/sec, and given an oil solution by a lubricator, to be bundled, then being taken up by first godet rollers (spinning speed 2000 m/min), and wound by a winder via second godet rollers rotating at the same speed as that of the first godet rollers. The fiber making operation efficiency was evaluated. Yarn breaking did not occur at all, to show very good fiber making operation efficiency.

The obtained fibers (description of the spun yarn: 100 decitexes—36 filaments) had a strength of 0.91 cN/dtex and an elongation of 35.8%, showing good properties.

Then, the fibers were used to form a tubular knitted fabric using a tubular knitting machine produced by Eiko Industrial Co., Ltd. The obtained tubular knitted fabric was treated by scouring at a temperature of 70° C. for 15 minutes, and at this time, all the amount of PEG600 contained as a water soluble plasticizer in the fibers was dissolved out. Subsequently the fibers were subjected to high temperature water treatment at a temperature of 120° C. for 60 minutes. After completion of high temperature water treatment, the fibers had a strength of 1.20 cN/dtex and an elongation of 14.4%, showing that good properties were maintained.

Working Example 12

Kneading was performed as described in Working Example 8, except that the plasticizer used in Working Example 8 was changed from PEG600 to PEG400/triacetine mixture (ratio by weight, 1:1), for obtaining pellets of a thermoplastic cellulose ester composition.

The pellets of the mixture were dried in vacuum at a temperature of 80° C. for 12 hours (water content after drying, 540 ppm), and subsequently supplied into a double screw extruder, to be molten, then being discharged from a spinneret (discharge hole diameter 0.23 mm, hole length 0.60 mm) at a spinning temperature of 260° C., to obtain filaments. The filaments were cooled by air with a temperature of 20° C. at an air velocity of 0.5 m/sec, and given an oil solution by a lubricator, to be bundled, then being taken up by first godet rollers (spinning speed 1500 m/min), and wound by a winder via second godet rollers rotating at the same speed as that of the first godet rollers. The fiber making operation efficiency was evaluated. Yarn breaking did not occur at all, to show very good fiber making operation efficiency.

The obtained fibers (description of the spun yarn: 100 decitexes—24 filaments) had a strength of 1.00 cN/dtex and an elongation of 34.8%, showing good properties.

Then, the fibers were used to form a tubular knitted fabric using a tubular knitting machine produced by Eiko Industrial Co., Ltd. The obtained tubular knitted fabric was treated by scouring at a temperature of 70° C. for 15 minutes, and at this time, the total amount of the PEG400/triacetine mixture contained as a water soluble plasticizer in the fibers was dissolved out. Subsequently the fibers were subjected to high temperature water treatment at a temperature of 120° C. for 60 minutes. After completion of high temperature water treatment, the fibers had a strength of 1.23 cN/dtex and an elongation of 12.0%, showing that good properties were maintained.

TABLE 1-2

| | | | Working Example 7 | Working Example 8 | Working Example 9 | Working Example 10 | Working Example 11 | Working Example 12 |
|---|---|---|---|---|---|---|---|---|
| Composition to be melt-spun | Cellulose fatty acid mixed ester | Name of the compound | CAP | CAP | CAP | CAP | CAB | CAP |
| | | Substitution degree | 2.6 | 2.6 | 2.6 | 2.6 | 2.7 | 2.6 |
| | | Content [wt %] | 77.6 | 77.0 | 77.0 | 77.0 | 76.0 | 77.0 |
| | Cellulose acetate | Substitution degree | 2.5 | 2.4 | 2.4 | 2.4 | 2.4 | 2.4 |
| | | Average polymerization degree | 140 | 180 | 140 | 150 | 180 | 180 |
| | | Content [wt %] | 3.0 | 5.0 | 5.0 | 5.0 | 3.0 | 5.0 |
| | Plasticizer | Name of the compound | PEG600 DEP | PEG600 | PEG600 | PEG600 | PEG600 | PEG400 triacetine |
| | | Content [wt %] | 19.3 (1.8 of DEP) | 17.9 | 17.9 | 17.9 | 20.8 | 17.9 |
| | Other additive | Name of the compound | Antioxidant | Antioxidant | Antioxidant | Antioxidant | Antioxidant | Antioxidant |
| | | Content [wt %] | 0.1 | 0.1 | 0.1 | 0.1 | 0.1 | 0.1 |
| | Melt viscosity [Pa · sec] | | 335 | 303 | 254 | 280 | 265 | 290 |
| Fiber properties | Spun yarn or stretched yarn | Strength [cN/dtex] | 0.89 | 1.06 | 0.73 | 0.99 | 0.91 | 1.00 |
| | | Elongation [%] | 34.2 | 31.5 | 28.1 | 33.8 | 35.8 | 34.8 |
| | | Single fiber fineness [dtex] | 3.8 | 4.2 | 4.2 | 4.2 | 2.8 | 4.2 |
| | | U % | 0.9 | 0.4 | 0.6 | 0.5 | 0.9 | 0.5 |
| | Before high temperature water treatment | Strength [cN/dtex] | 1.22 | 1.45 | 1.15 | 1.40 | 1.08 | 1.40 |
| | | Elongation [%] | 28.0 | 24.2 | 28.0 | 25.8 | 34.0 | 26.0 |

TABLE 1-2-continued

|  |  | Working Example 7 | Working Example 8 | Working Example 9 | Working Example 10 | Working Example 11 | Working Example 12 |
|---|---|---|---|---|---|---|---|
| After high temperature water treatment | Strength [cN/dtex] | 1.15 | 1.26 | 0.98 | 1.18 | 1.20 | 1.23 |
|  | Elongation [%] | 15.3 | 10.1 | 7.6 | 7.8 | 14.4 | 12.0 |
| Fiber making operation efficiency |  | ◎ | ◎ | ◎ | ◎ | ◎ | ◎ |

CAP: Cellulose acetate propionate
PEG600: Polyethylene glycol (average molecular weight 600)
DEP: Diethyl phthalate Comparative Example 1

The CAP/PEG600/antioxidant composition obtained in Production Example 1 was dried in vacuum at a temperature of 80° C. for 12 hours (water content after drying, 470 ppm), and supplied into a double screw extruder, to be molten, then being discharged from a spinneret (discharge hole diameter 0.23 mm, hole length 0.46 mm) at a spinning temperature of 260° C., to obtain filaments. The filaments were cooled by air with a temperature of 20° C. at an air velocity of 0.5 m/sec, and given an oil solution by a lubricator, to be bundled, then being taken up by first godet rollers (spinning speed 1500 m/min) and wound by a winder via second godet rollers rotating at the same speed as that of the first godet rollers. The fiber making operation efficiency was evaluated. Yarn breaking did not occur at all, to show very good fiber making operation efficiency.

The obtained fibers (description of the spun yarn: 100 decitexes—24 filaments) had a strength of 1.25 cN/dtex and an elongation of 26.4%, showing good properties.

Then, the fibers were used to form a tubular knitted fabric using a tubular knitting machine produced by Eiko Industrial Co., Ltd. The obtained tubular knitted fabric was treated by scouring at a temperature of 70° C. for 15 minutes, and at this time all the amount of PEG600 contained as a water soluble plasticizer in the fibers was dissolved out. Subsequently the fibers were subjected to high temperature water treatment at a temperature of 120° C. for 60 minutes. After completion of high temperature water treatment, the fibers had a strength of 0.20 cN/dtex and an elongation of 3.2%. The properties of the fibers greatly declined compared those of the spun yarn and the fibers not yet subjected to the treatment.

Comparative Example 2

Spinning was performed as described in Working Example 1, except that the ratio by weight of the CAP/PEG600/antioxidant composition obtained in Production Example 1 and the cellulose acetate/diethyl phthalate (63/37) composition ("Acety (grade 37%") produced by Daicel FineChem. Ltd.) was changed to the ratio by weight shown in Table 2. The fiber making operation efficiency was evaluated. Yarn breaking did not occur at all, to show very good fiber making operation efficiency. The obtained fibers (description of the spun yarn: 100 decitexes—24 filaments) had a strength of 1.20 cN/dtex and an elongation of 25.4%, showing good properties. The fibers were used to form a tubular knitted fabric under the same conditions as in Working Example 1, and in succession the fabric was treated by scouring and subjected to high temperature water treatment. After completion of high temperature water treatment, the fibers had a strength of 0.22 cN/dtex and an elongation of 3.4%. The properties of the fibers greatly declined compared with those of the spun yarn and the fibers not yet subjected to the treatment.

Comparative Example 3

Spinning was performed as described in Working Example 1, except that the ratio by weight of the CAP/PEG600/antistatic agent composition obtained in Production Example 1 and the cellulose acetate/diethylene phthalate (63/37) composition ("Acety (grade 37%)" produced by Daicel FineChem. Ltd.) was changed to the ratio by weight shown in Table 2. Since the cellulose acetate Content of the composition was too large, yarn breaking occurred frequently, and no wound yarn could be obtained.

Comparative Example 4

The cellulose acetate propionate of Production Example 1, a cellulose triacetate (LT-105, average substitution degree 2.9, average polymerization degree 360) produced by Daicel Chemical Industries, Ltd.), polyethylene glycol with an average molecular weight of 600 (PEG600) and bis(2,6-di-t-butyl-4-methylphenyl) pentaerythritol diphosphite as a phosphorus-based antioxidant were kneaded at the ratio by weight shown in Table 2 and at a temperature of 260° C. using a double screw extruder, and the obtained gut was cut to approximately 5 mm, to obtain pellets of a thermoplastic cellulose ester composition. The pellets were dried in vacuum at a temperature of 80° C. for 12 hours, and subsequently spun as described in Working Example 1. However, since the viscosity of the molten and spun composition was too high, yarn breaking occurred frequently, not allowing the fibers to be wound.

Production Example 3

A cellulose acetate propionate (CAP) with an average substitution degree by acetyl groups of 2.0 and an average substitution degree by propionyl groups of 0.9 (weight average molecular weight 187,000) was obtained by changing the supplied amounts of the esterifying agents in Production Example 1.

Comparative Example 5

The cellulose acetate propionate (substitution degree 2.9 (average substitution degree by acetyl groups 2.0 and average substitution degree by propionyl groups 0.9), weight average molecular weight 187,000) of Production Example 3, a cellulose acetate (type L-40, average substitution degree 2.4, average polymerization degree 160) produced by Daicel Chemical Industries, Ltd., polyethylene glycol with an average molecular weight of 600 (PEG600) and bis(2,6-di-t-butyl-4-methylphenyl)pentaerythritol diphosphite as a phosphorus-based antioxidant were kneaded at the ratio by weight shown in Table 2 and at a temperature of 260° C. using a double screw extruder, and the obtained gut was cut to approximately 5 mm, to obtain pellets of a thermoplastic cellulose ester composition as a mixture. The pellets were dried in vacuum at a temperature of 80° C. for 12 hours (water content after drying, 605 ppm), and subsequently supplied into a double screw extruder, to be molten, then being discharged from a spinneret (discharge hole diameter 0.23 mm, hole length 0.46 mm) at a spinning temperature of 270° C., to obtain filaments. The filaments were cooled by air with a temperature of 20° C. at an air velocity of 0.5 m/sec, and given an oil solution by a lubricator, to be bundled, then being taken up by first godet rollers (spinning speed 1500 m/min) and wound by a winder via second godet rollers rotating at the same speed as the first godet rollers. The fiber making operation efficiency was evaluated. Yarn breaking occurred 4 times, to show poor fiber making operation efficiency. The obtained fibers (description of the spun yarn: 100 decitexes—24 filaments) had a strength of 0.35 cN/dtex and an elongation of 9.4%, showing poor properties.

Then, the fibers were used in an attempt to form a tubular knitted fabric using a tubular knitting machine produced by Eiko Industrial Co., Ltd. However, while the tubular knitted fabric was produced, yarn breaking occurred frequently, not allowing a tubular knitted fabric to be obtained.

Production Example 4

A cellulose acetate propionate (CAP) with an average substitution degree by acetyl groups of 1.8 and an average substitution degree by propionyl groups of 0.4 (weight average molecular weight 143,000) was obtained by changing the supplied amounts of the esterifying agents in Production Example 1.

Comparative Example 6

The cellulose acetate propionate (average substitution degree 2.2 (average substitution degree by acetyl groups 1.8, average substitution degree by propionyl groups 0.4), weight average molecular weight 143,000) of Production Example 4, a cellulose acetate (type L-40, average substitution degree 2.4, average polymerization degree 160) produced by Daicel Chemical Industries, Ltd.), polyethylene glycol with an average molecular weight of 600 (PEG600) and bis(2,6-di-t-butyl-4-methylphenyl) pentaerythritol diphosphite as a phosphorus-based antioxidant were kneaded at the ratio by weight shown in Table 2 and at a temperature of 260° C. using a double screw extruder, and the obtained gut was cut to approximately 5 mm, to obtain pellets of a thermoplastic cellulose ester composition. The pellets were dried in vacuum at a temperature of 80° C. for 12 hours (water content after drying, 490 ppm), and subsequently supplied into a double screw extruder, to be molten, then being discharged from a spinneret (discharge hole diameter 0.23 mm, hole length 0.46 mm) at a spinning temperature of 260° C., to obtain filaments. The filaments were cooled by air with a temperature of 20° C. at an air velocity of 0.5 m/sec, and given an oil solution by a lubricator, to be bundled, then being taken up by first godet rollers (spinning speed 1500 m/min) and wound by a winder via second godet rollers rotating at the same speed as that of the first godet rollers. The obtained fibers were poor in miscibility between the CAP and cellulose acetate. The fiber making operation efficiency was evaluated. Yarn breaking occurred 3 times, showing poor fiber making operation efficiency. The obtained fibers (description of the spun yarn: 100 decitexes—24 filaments) had a strength of 0.44 cN/dtex and an elongation of 13.3%, showing poor properties.

Then, the fibers were used to form a tubular knitted fabric using a tubular knitting machine produced by Eiko Industrial Co., Ltd. The obtained tubular knitted fabric was treated by scouring at a temperature of 70° C. for 15 minutes, and at this time, all the amount of PEG600 contained as a water soluble plasticizer in the fibers was dissolved out. Subsequently the fibers were subjected to high temperature water treatment at a temperature of 120° C. for 60 minutes. After completion of high temperature water treatment, the fibers had a strength of 0.28 cN/dtex and an elongation of 4.5%, showing that the properties greatly declined compared those obtained before treatment.

TABLE 2

| | | | Comparative Example 1 | Comparative Example 2 | Comparative Example 3 | Comparative Example 4 | Comparative Example 5 | Comparative Example 6 |
|---|---|---|---|---|---|---|---|---|
| Composition to be melt-spun | Cellulose fatty acid mixed ester | Name of the compound | CAP | CAP | CAP | CAP | CAP | CAP |
| | | Substitution degree | 2.6 | 2.6 | 2.6 | 2.6 | 2.9 | 2.2 |
| | | Content [wt %] | 81.5 | 80.7 | 66.8 | 77.0 | 77.0 | 77.0 |
| | Cellulose acetate | Substitution degree | — | 2.5 | 2.5 | 2.9 | 2.4 | 2.4 |
| | | Average polymerization degree | — | 140 | 140 | 360 | 160 | 160 |
| | | Content [wt %] | — | 0.6 | 11.3 | 3.0 | 3.0 | 3.0 |
| | Plasticizer | Name of the compound | PEG600 | PEG600 DEP | PEG600 DEP | PEG600 | PEG600 | PEG600 |
| | | Content [wt %] | 18.4 | 18.6 (0.4 of DEP) | 21.8 (6.7 of DEP) | 19.9 | 19.9 | 19.9 |
| | Other additive | Name of the compound | Antioxidant | Antioxidant | Antioxidant | Antioxidant | Antioxidant | Antioxidant |
| | | Content [wt %] | 0.1 | 0.1 | 0.1 | 0.1 | 0.1 | 0.1 |
| | Melt viscosity [Pa · sec] | | 341 | 339 | 366 | 540 | 522 | 489 |
| Fiber properties | Spun yarn or stretched yarn | Strength [cN/dtex] | 1.25 | 1.20 | — | — | 0.35 | 0.44 |
| | | Elongation [%] | 26.4 | 25.4 | — | — | 9.4 | 13.3 |
| | | Single fiber fineness [dtex] | 4.2 | 4.2 | — | — | 4.2 | 4.2 |
| | | U % | 0.5 | 0.5 | — | — | 0.6 | 0.6 |
| | Before high temperature water treatment | Strength [cN/dtex] | 1.60 | 1.58 | — | — | — | 0.63 |
| | | Elongation [%] | 19.1 | 17.9 | — | — | — | 8.5 |
| | After high temperature water treatment | Strength [cN/dtex] | 0.20 | 0.22 | — | — | — | 0.28 |
| | | Elongation [%] | 3.2 | 3.4 | — | — | — | 4.5 |
| Fiber making operation efficiency | | | ◎ | ◎ | X | X | X | X |

CAP: Cellulose acetate propionate
PEG600: Polyethylene glycol (average molecular weight 600)
DEP: Diethyl phthalate The fibers made from the thermoplastic cellulose ester composition of this invention can be used as clothing fibers, industrial fibers, and nonwoven fabrics, etc., and since they can be dyed at high temperature, they can be especially used as clothing fibers, suitably as fibers to be mixed with polyester fibers and as fabrics woven or knitted together with polyester fibers.

The invention claimed is:

1. A thermoplastic cellulose ester composition comprising at least 70 to 95 wt % of a cellulose fatty acid mixed ester with an average substitution degree of 2.4 to 2.8, 5 to 25 wt % of a plasticizer and 1 to 10 wt % of a cellulose acetate with an average substitution degree of 2.3 to 2.6.

2. A thermoplastic cellulose ester composition, according to claim 1, wherein the cellulose fatty acid mixed ester is a cellulose acetate propionate.

3. Fibers made from a thermoplastic cellulose ester composition containing at least 70 to 95 wt % of a cellulose fatty acid mixed ester with an average substitution degree of 2.4 to 2.8, 5 to 25 wt % of a plasticizer and 1 to 10 wt % of a cellulose acetate with an average substitution degree of 2.3 to 2.6.

4. A fibrous structure at least partially containing the fibers made from a thermoplastic cellulose ester composition as set forth in claim 3.

* * * * *